United States Patent [19]

Morita

[11] Patent Number: 5,072,090
[45] Date of Patent: Dec. 10, 1991

[54] INVERTER TYPE RESISTANCE WELDING MACHINE

[75] Inventor: Tatsuo Morita, Tokyo, Japan

[73] Assignee: Obara Corporation, Tokyo, Japan

[21] Appl. No.: 558,803

[22] Filed: Jul. 27, 1990

[51] Int. Cl.$^5$ ............................................. B23K 11/24
[52] U.S. Cl. ............................................. 219/108
[58] Field of Search ............................. 219/108, 110

[56] References Cited

U.S. PATENT DOCUMENTS 3,153,728 10/1964 Procter ................................ 219/108
4,063,075 12/1977 Collom ................................ 219/108
4,985,612 1/1991 Izume et al. ........................ 219/110
4,999,477 3/1991 Yamaguchi et al. .

Primary Examiner—Clifford C. Shaw
Attorney, Agent, or Firm—Flynn, Thiel, Boutell & Tanis

[57] ABSTRACT

There is described an inverter type resistance welding machine comprising one rectifier, one inverter connected in series to the rectifier, and a plurality of welding current elements connected in series between a plurality of welding transformers and an output of one inverter. It is possible to reduce the space of installation of the resistance welding machine and cost involved in the installation thereof and reduce a weld time.

10 Claims, 7 Drawing Sheets

INVERTER TYPE RESISTANCE WELDING MACHINE

BACKGROUND OF THE INVENTION

1. Field of the Invention

The present invention relates to an inverter type resistance welding machine having one rectifer circuit and one inverter connected to the rectifier and welding control elements connected between an output of the inverter and a plurality of resistance welding machines.

2. Prior Art

A typical prior art arrangement of a resistance welding machine will be described with reference to FIGS. 4 to 6.

In a first aspect of the prior art arrangement, there are provided a plurality of rectifiers 34, 35, 36, a plurality of inverters 37, 38, 39 respectively connected to the plurality of rectifiers 34, 35, 36, a plurality of transformers 40, 41, 42 respectively connected to the inverters 37, 38, 39, and a plurality of welding machines 31, 32, 33 respectively connected to each secondary winding of each welding transformer 40, 41, 42 respectively independent of each other.

In a second aspect of the prior art arrangement, there are provided a rectifier 51, an inverter 52 connected to the rectifier 51, a tranformer 53 connected to the inverter 52, and a plurality of welding machines 54, 55, 56 each connected to a secondary winding of the welding transformer 53 and arranged in parallel with each other as illustrated in FIG. 5.

In a third aspect of the prior art arrangement, there are provided a rectifier 61, an inverter 62 connected to the rectifier 61, a plurality of transformers 66, 67, 68 each connected to the inverter 62, and a plurality of welding machines 63, 64, 65 connected to a secondary winding of each transformer and arranged in parallel with each other as illustrated in FIG. 6.

There are following problems in the first to third aspects of the prior arts.

In the first aspect of the prior arts, inasmuch as there are provided rectifiers 34, 35, 36 and inverters 37, 38, 39 respectively connected to the rectifiers 34, 35, 36 for each welding machine 31, 32, 33, constant current control thereof can be made independently. However, such constant current control for each welding machine involves very high cost and large space for installing thereof.

Furthermore, inasmuch as the welding current is supplied freely to each welding machine 31, 32, 33, there is a case that a timing for applying or supplying the welding current to a plurality of welding machines is overlapped at some welding machines, which entails a large voltage drop of a power supply 43 to deteriorate welding quality and generate troubles in a welding current control unit. To prevent these problems, a large scale of power supply installment is required.

Still furthermore, in the second and third aspects of the prior arts, it is necessary to apply or supply pressure and welding current to each welding machine considering the constant current or the space for installing the current control unit. In this case, no pressure is applied to other welding machines which are each at a standby condition just after the pressure, the welding current is applied to and kept applied to one welding machine. Hence, it was necessary to start welding operation for the other welding machines just after completion of welding operation of one welding machine, which entails much time.

SUMMARY OF THE INVENTION

The present invention has been made to solve the problems of the prior art resistance welding machine.

It is therefore an object of the present invention to provide an inverter type resistance welding machine capable of reducing the space of installation of the welding machine and reducing the welding operation time with low cost.

The above and other objects, features and advantages of the present invention will become more apparent from the following description taken in conjunction with the accompanying drawings.

Figure 1:
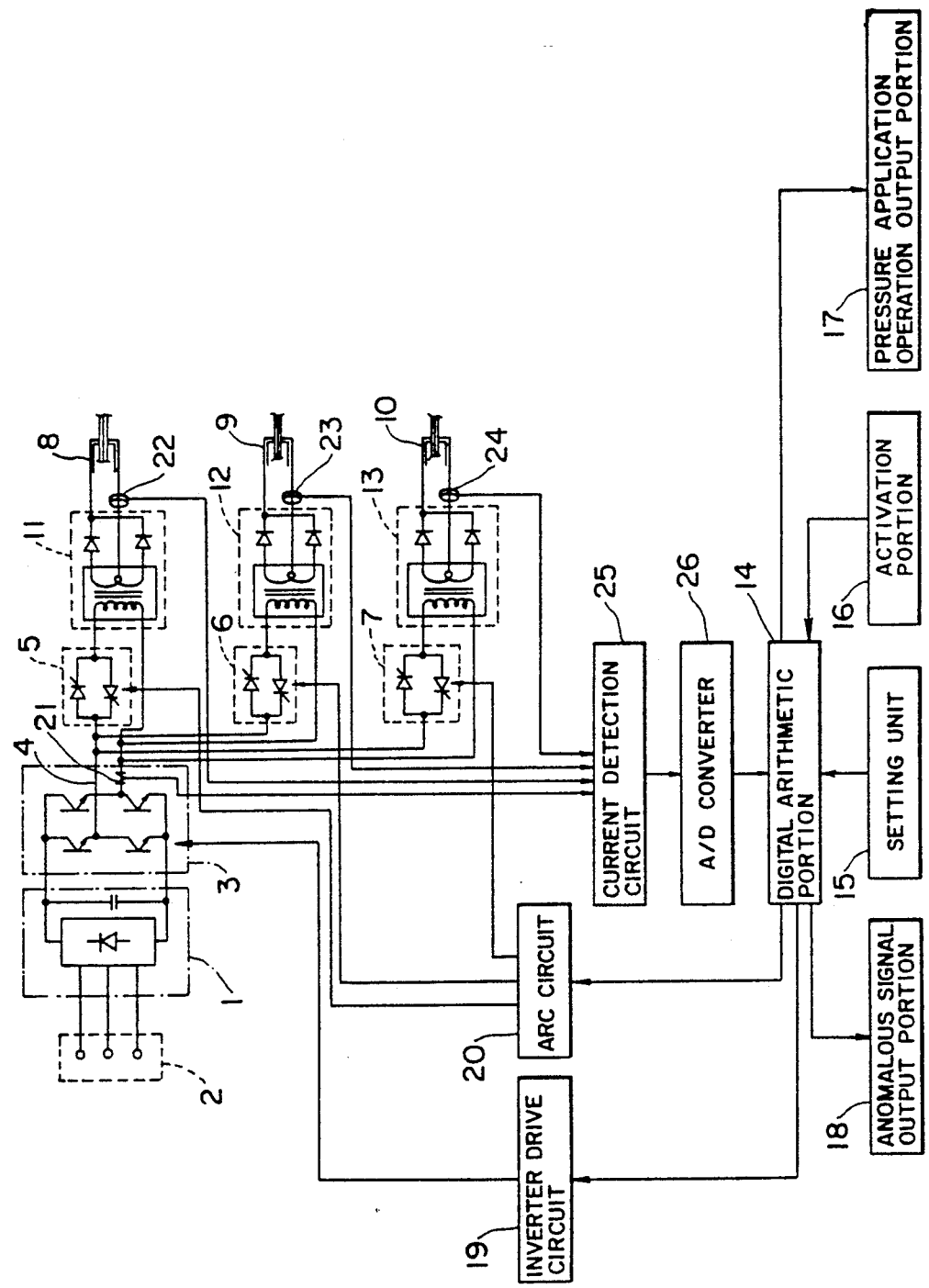
FIG. 1 is a block diagram of an inverter type resistance welding machine according to a preferred embodiment of the present invention.
Figure 2:
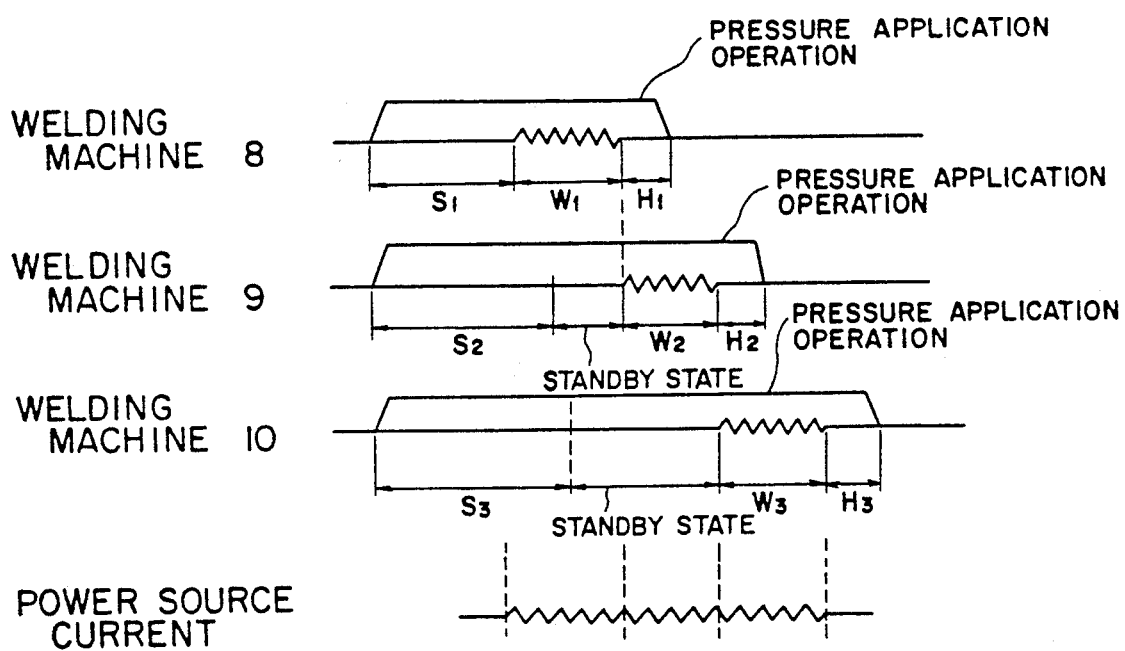
FIG. 2 is a view of assistance in explaining a relationship between pressure application time, welding curent application time, and hold time of each resistance welding machine.
Figure 3A:
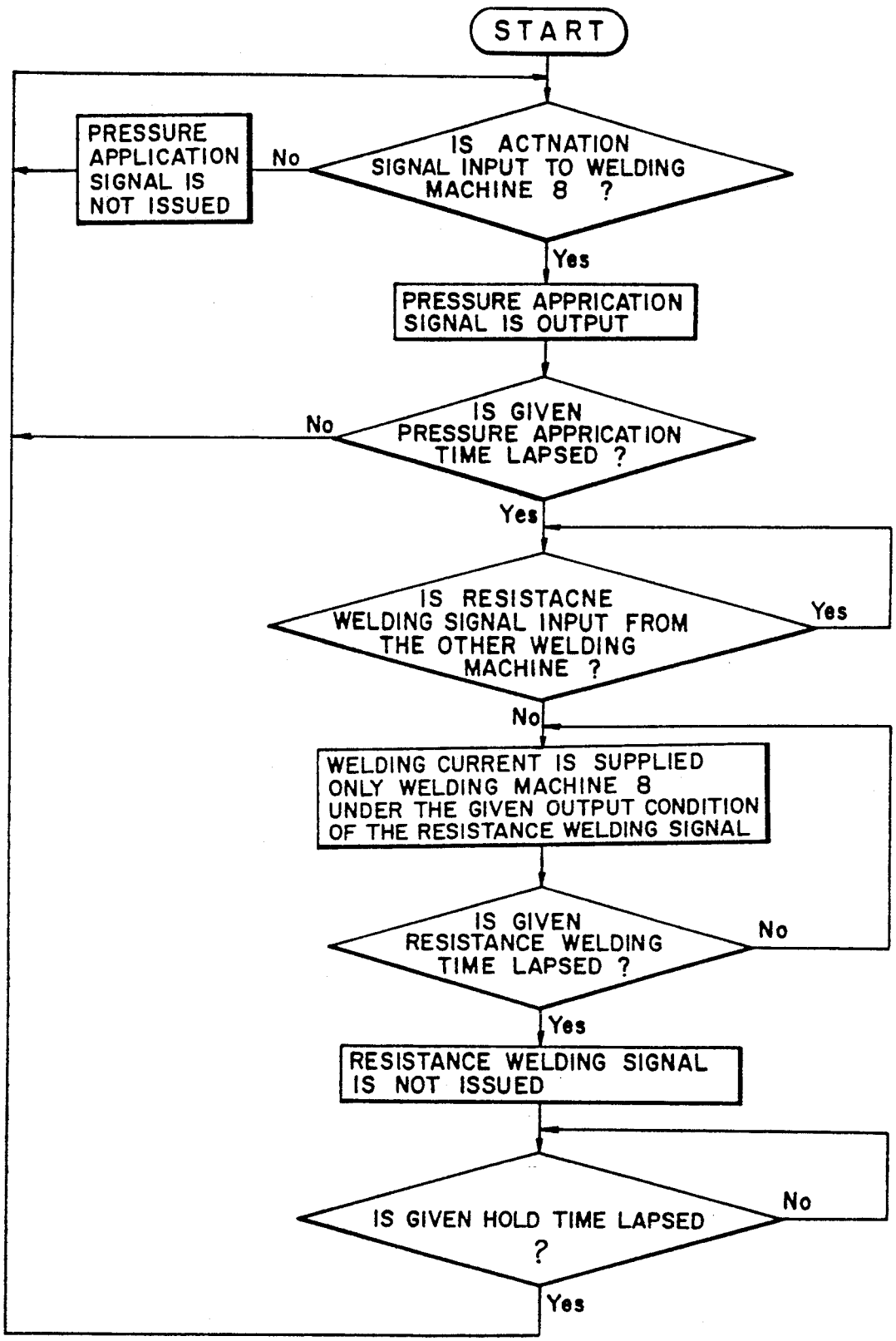
FIGS. 3(A) to (C) are schematic flow charts showing an automatic control operation of the resistance welding machine according to a preferred embodiment of the present invention.
Figure 3:
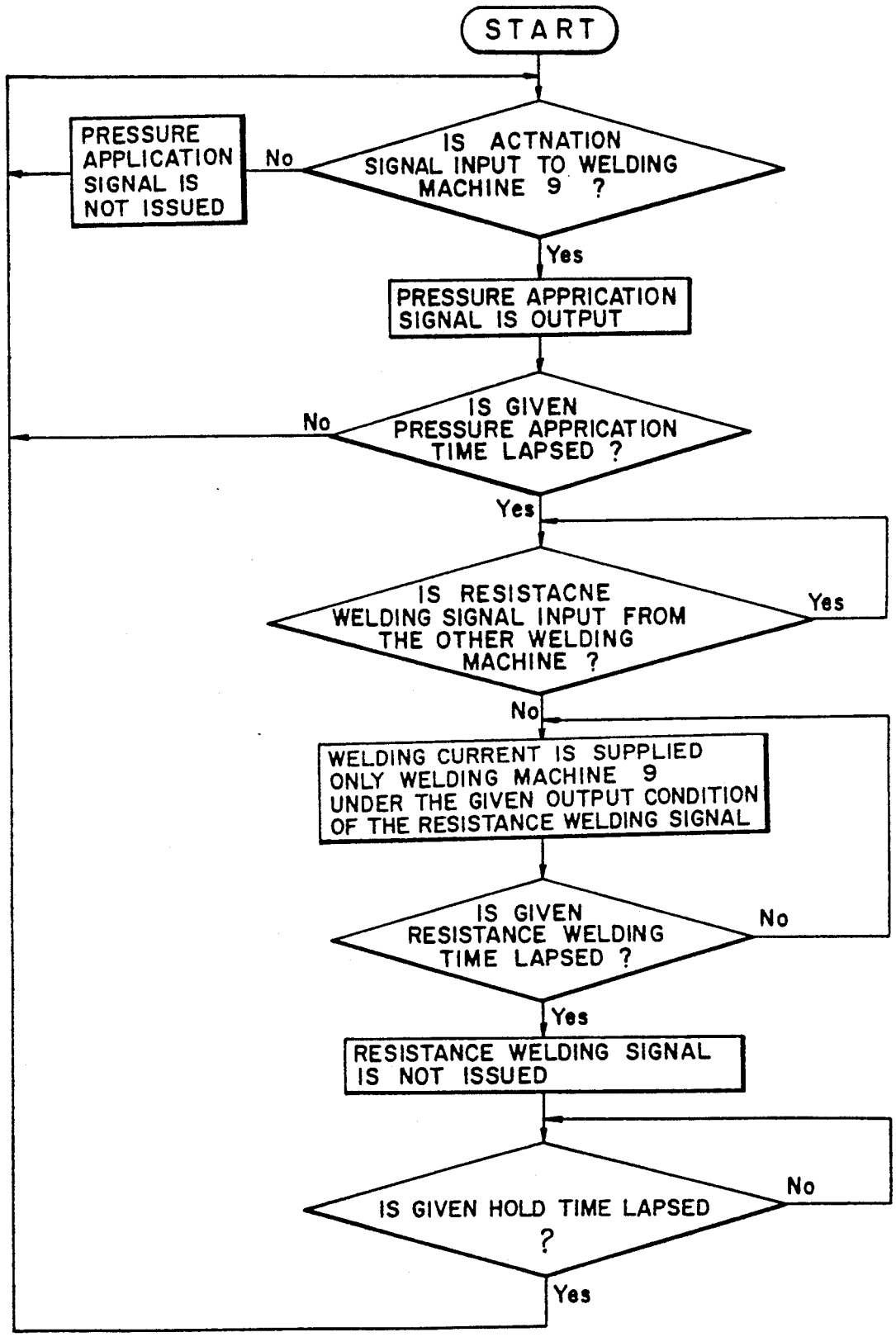

PREFERRED EMBODIMENT OF THE INVENTION (FIGS. 1 to 3)

A resistance welding machine according to a preferred embodiment of the invention will be described with reference to FIGS. 1 to 3.

The resistance welding machine comprises a rectifier 1 connected to a power frequency alternating current power supply terminal 2, three thyristors 5, 6, 7 each connected in series to an output terminal of the inverter 3 for controlling the current flowing to each welding transformer 11, 12, 13, three transformers 11, 12, 13 each connected in series to the output of the thyristors 5, 6, 7 and three resistance welding machines 8, 9, 10 each connected in series to secondary windings of the transformers 11, 12, 13.

The arrangement further comprises a setting unit 15 storing a predetermined set welding schedule such as initial pressure application time, current application time, hold time for each welding machine 8, 9, 11, a digital arithmetic portion 14 for receiving the predetermined welding schedule and performing an arithmetic operation upon reception of an activation signal issued from an activation portion 16, a pressure application operation output portion 17 for receiving a pressure application signal from the digital arithmetic portion 14 and applying pressure to the welding machines 8, 9, 10, an anomalous signal output portion 18 for receiving an anomalous signal from the digital arithmetic portion 14 and outputing the anomaly of the welding machines 8, 9, 10, an inverter drive circuit 19 for receiving a signal from the digital arithmetic portion 14 and controlling the inverter 3, and an arc circuit 20 for receiving a signal from the digital arithmetic portion 14 and controlling to arc in the inversed parallel thyristors 5, 6, 7.

The same arrangement further comprises a CT (current transformer) 21 connected to the output 4 of the inverter 3, toroidal cores 22, 23, 24 connected between the secondary windings of the transformers 11, 12, 13 and the welding machines 8, 9, 10. The CT 21 and the toroidal cores 22, 23, 24 respectively detect the current, a current detection circuit 25 is connected to the CT 21 and the toroidal cores 22, 23, 24 for receiving the resultant detected analog value therefrom, and an analog to digital coverter (hereinafter referred to as A/D converter) 26 is connected between the current detection circuit 25 and the digital arithmetic portion 14 for converting the resultant analog values to digital values and supplying the same digital values to the digital arithmetic portion 14.

Figure 3C:
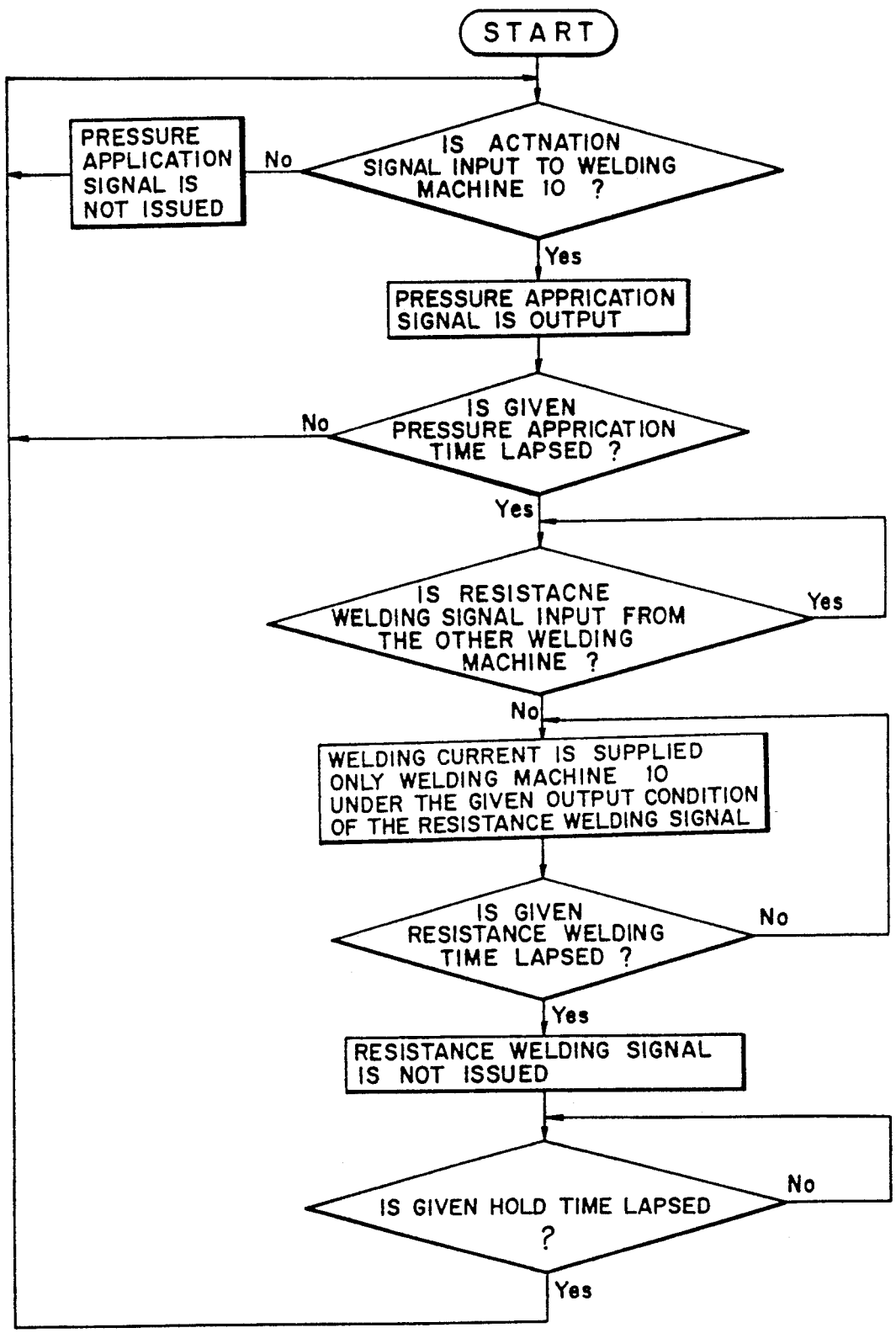
Figure 4:
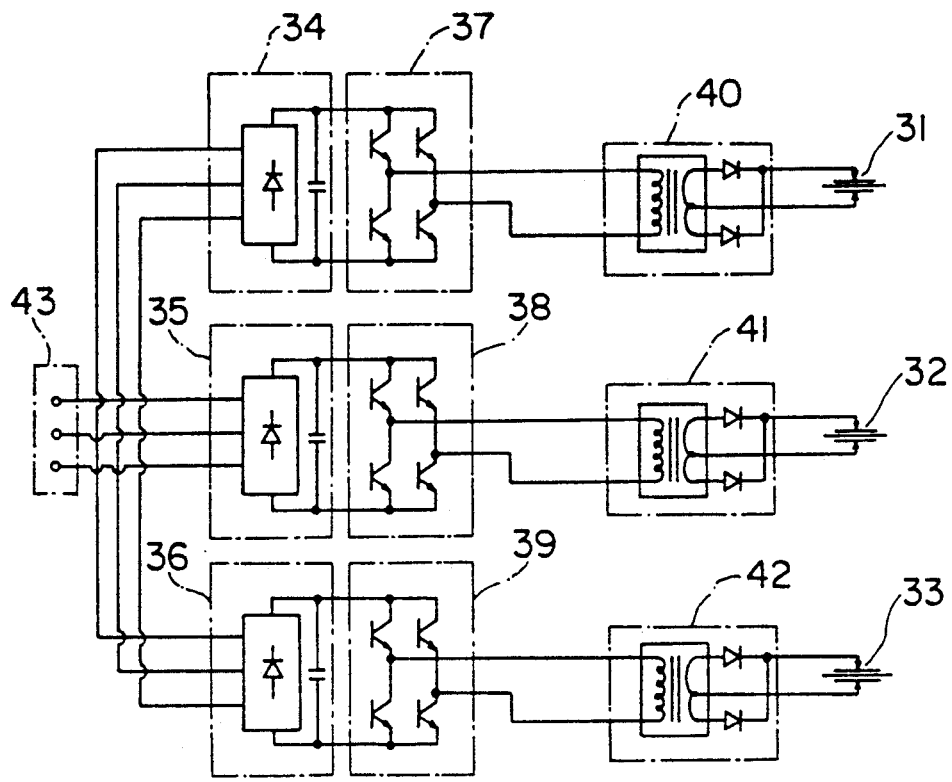
FIGS. 4 to 6 are block diagrams showing arrangements of prior art resistance welding machines.
Figure 5:
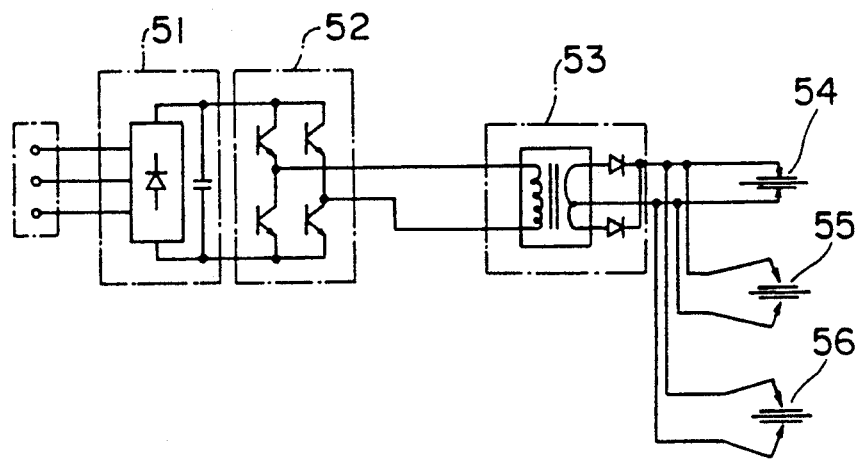
Figure 6:
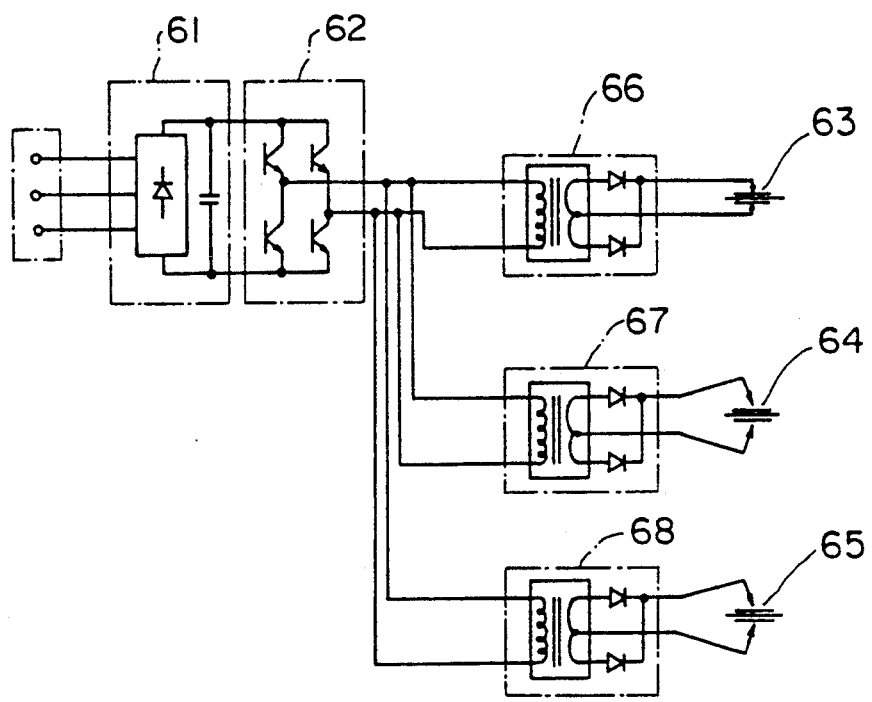

An operation of the resistance welding machine having such an arrangement according to the preferred embodiment of the present invention will be described hereinafter with reference to FIGS. 3(A) to 3(C).

When the digital arithmetic portion 14 receives the activation signal from the activation portion 16, the digital arithmetic portion 14 provides the pressure application signal to the pressure application operation output portion 17 which is supplied to each welding machine so that each welding machine 8, 9, 10 can perform the pressure application operation by closing conventional welding jaws as illustrated in FIGS. 1 and 4–6.

A power frequency alternating current is converted by the rectifier 1 to a direct current which is supplied to the inverter 3. The inverter 3 generates a high frequency alternating current pulse at an output thereof. Inasmuch as three inversed thryisters 5, 6, 7 are connected to the output terminal 4 of the inverter 3 and arranged in parallel with each other, the current is supplied to the transformers 11, 12, 13 of each welding machine 8, 9, 10 by arcing in the thyristers. The direct current converted by the transformers 11, 12, 13 is successively supplied to the welding machines 8, 9, 10.

The inverter 3 receives an inverter drive control signal from the digital arithmetic portion 14 via the inverter drive circuit 19 and the inversed parallel thyristors 5, 6, 7 each receive a control signal from the digital arithmetic portion 14 via the arc circuit 20 so that the inverter 3 and the inversed parallel thyristors 5, 6, 7 are controlled to supply welding current to the welding machines 8, 9, 10 in the successive order when the initial pressure application time S is lapsed. Since both the inverter drive control signal and the inversed thyristor control signal are involved in resistance welding signal, hence they are hereinafter referred to as such.

Assume that the initial pressure application time in the welding machine 8 is S1, the initial pressure application time in the welding machine 10 is S2, the initial pressure application time in the welding machine 9 is S3, and the expression S1<S2<S3 is established between the times S1, S2, S3. The resistance welding signal required for the welding operation of the welding machine 8 is supplied to the inverter drive circuit 19 and the arc circuit 20 from the digital arithmetic portion 14 so that the inverter 3 and the inversed parallel thyristor 5 are controlled to supply the welding current to the welding machine 8. Even if the initial pressure application times S2, S3 are lapsed in other welding machines 9, 10 during the welding operation in the welding machine 8, the resistance welding signal required for the welding operation of the welding machines 9, 10 is not supplied by the digital arithmetic portion 14. Both the welding machines 9, 10 enter into standby condition at the time of completion of the first pressure application.

At the time when the weld time W1 elapsed in the welding machine 8, the digital arithmetic portion 14 supplies the resistance welding signal to the welding machine 9 so that the welding machine can start welding operation at the weld time W2. In the same way, the welding machine 10 can start the welding operation at the weld time W3.

Accordingly, the welding current is successively suplied to the welding machines 8, 9, 10 during which the weld timing is not overlapped at the weld times W1, W2, W3.

A constant current control of the welding machines 8, 9, 10 will be described hereinafter.

The welding current is detected by the CT 21 or the toroidal coils 22, 23, 24 and the detected welding current is supplied to the digital arithmetic portion 14 via the current detection circuit 25 and the A/D converter 26. The constant current control is effected by the current value fed back to the digital arithmetic portion 14 for supplying the welding current to the welding mchines.

Although the inversed parallel thyristors are employed as the welding current control element according to the preferred embodiment of the present invention, a semiconductor switch (AC switch) or an electromagnetic switch can serve as the welding current control element.

The inverter type resistance welding machine according to the present invention having the structure set forth above has the following advantages.

Inasmuch as the plurality of welding current elements are connected in series to the plurality of welding transformers relative to one rectifier and one inverter, it is possible to reduce the space of installation of the welding machine and cost involved in the installation. Furthermore, inasmuch as the inverter is connected in series to the plurality of welding current control elements and the welding current control elements are connected in series to the welding transformers, it is possible to supply the welding current successively to each welding machine without overlapping the weld timing so that the weld time can be reduced remarkably compared with that of the prior art welding machine and the voltage drop of the power supply can be compensated to thereby the scale of the facility of the power supply.

Although the invention has been described in its preferred form with a certain degree of particularity, it is to be understood that many variations and changes are possible in the invention without departing from the scope thereof.

What is claimed is:

1. An inverter type resistance welding machine, comprising:
rectifier means for receiving a relatively low frequency AC power input and converting the AC power input into a DC power output;
inverter means connected to said rectifier means for receiving said DC power output therefrom and converting said DC power output into a relatively high frequency AC power output, said inverter means having an output terminal which provides access to said AC power output;
first and second welding units which respectively include first and second sets of openable and closable welding jaws which are closable to apply clamping pressure to a workpiece positioned therebetween and which are openable to remove the clamping pressure, said first and second welding units also respectively including first and second welding transformers for transforming said AC power output into an operative welding current for use by the corresponding welding jaws;

selectively actuable switching means for selectively applying said AC power output exclusively to each one of said welding transformers, including means for selectively connecting said output terminal of said inverter means exclusively to each one of said welding transformers;

selectively actuable pressure applying means for selectively causing each set of said welding jaws to close and apply clamping pressure to a workpiece; and control means for effecting selective actuation and deactuation of said switching means and said pressure applying means in a predetermined sequence, including means for actuating said pressure applying means and closing said first set of welding jaws at a first point in time, means for maintaining said first set of welding jaws closed for at least a first pressure application time, means for prohibiting application of said AC power output to said first welding transformer throughout said first pressure application time, means for actuating said pressure applying means and closing said second set of welding jaws at a second point in time which is one of simultaneous with and subsequent to said first point in time at which said first set of welding jaws is closed, means for maintaining said second set of welding jaws closed for at least a second pressure application time which overlaps said first pressure application time, means for prohibiting application of said AC power output to said second welding transformer throughout said second pressure application time, means for actuating said switching means immediately after said first pressure application time has expired and applying said AC power output exclusively to said first welding transformer for a first welding time which overlaps said second pressure application time, means for prohibiting application of said AC power output to said second welding transformer until said first welding time has elapsed, and means for actuating said switching means to remove said AC power output from said first welding transformer and apply said AC power output exclusively to said second welding transformer immediately after said first welding time has elapsed.

2. An inverter type resistance welding machine according to claim 1, further comprising a current transformer connected to an output of the inverter means, a plurality of toroidal cores each connected between secondary windings of the welding transformers and the welding jaws, the current transformer and the toroidal cores respectively detecting welding current, a current detection circuit connected to the current transformer and the toroidal cores for receiving a resultant detected analog value therefrom, an analog to digital converter connected to the current detection circuit for converting the resultant analog values to digital values and supplying the same digital values to the control means.

3. An inverter type resistance welding machine according to claim 1, wherein the switching means comprises a plurality of pairs of inversed parallel thyristors connected in series respectively between said output terminal of said inverter means and said welding transformers.

4. An inverter type resistance welding machine according to claim 1, wherein the switching means comprises semiconductor switches.

5. An inverter type resistance welding machine according to claim 1, wherein the switching means comprises electromagnetic switches.

6. An inverter type resistance welding machine claim 1, wherein said second pressure application time is shorter than a sum of said first pressure application time and said first welding time.

7. An inverter type resistance welding machine claim 6, wherein said second pressure application time is longer than said first pressure application time.

8. A method for performing a welding operation, comprising the steps of:

providing a rectifier means for receiving a relatively low frequency AC power input and converting the AC power input into a DC power output;

providing an inverter means for receiving said DC power output from said rectifier means and converting said DC power output into a relatively high frequency AC power output, and providing said inverter means with an output terminal which permits access to said AC power output;

providing first and second welding units which respectively include first and second sets of openable and closable welding jaws which are closable to apply clamping pressure to a workpiece positioned therebetween and which are openable to remove the clamping pressure, and respectively providing said first and second welding units with first and second welding transformers for transforming said AC power output into an operative welding current for use by the corresponding welding jaws;

providing a selectively actuable switching means for selectively applying said AC power output exclusively to each one of said welding transformers, and providing said switching means with a means for selectively connecting said output terminal of said inverter means exclusively to each one of said welding transformers;

closing said first set of welding jaws at a first point in time;

maintaining said first set of welding jaws closed for at least a first pressure application time;

prohibiting application of said AC power output to said first welding transformer throughout said first pressure application time;

closing said second set of welding jaws at a second point in time which is one of simultaneous with and subsequent to said first point in time at which said first set of welding jaws is closed;

maintaining said second set of welding jaws closed for at least a second pressure application time which overlaps said first pressure application time;

prohibiting application of said AC power output to said second welding transformer throughout said second pressure application time;

determining that said first pressure application time has expired, and immediately thereafter applying said AC power output exclusively to said first welding transformer throughout a first welding time which overlaps said second pressure application time;

removing said AC power output from said first welding transformer when said first welding time elapses;

prohibiting application of said AC power output to said second welding transformer until said first welding time has elapsed; and applying said AC power output exclusively to said second welding transformer immediately after said first welding time has elapsed.

9. A method according to claim 8, wherein said second pressure application time is shorter than a sum of said first pressure application time and said first welding time.

10. A method according to claim 8, wherein said second pressure application time is longer than said first pressure application time.

* * * * *

UNITED STATES PATENT AND TRADEMARK OFFICE
CERTIFICATE OF CORRECTION

PATENT NO. : 5 072 090

DATED : December 10, 1991

INVENTOR(S) : Tatsuo Morita

It is certified that error appears in the above-identified patent and that said Letters Patent is hereby corrected as shown below:

```
Column 6, line  9; after "machine" insert ---according to---.
Column 6, line 13; after "machine" insert ---according to---.
Column 8, line  8; change "claim 8," to ---claim 9,---.
```

Signed and Sealed this

Twenty-fifth Day of May, 1993

*Attest:*

MICHAEL K. KIRK

*Attesting Officer*  Acting Commissioner of Patents and Trademarks